June 13, 1933.  W. R. UGGLA  1,913,523

GEARED ELECTRIC MOTOR

Filed April 16, 1930  4 Sheets-Sheet 1

INVENTOR
Wilhelm Robert Uggla
BY
ATTORNEY

June 13, 1933.     W. R. UGGLA     1,913,523
GEARED ELECTRIC MOTOR
Filed April 16, 1930     4 Sheets-Sheet 2

INVENTOR
Wilhelm Robert Uggla
BY
his ATTORNEY

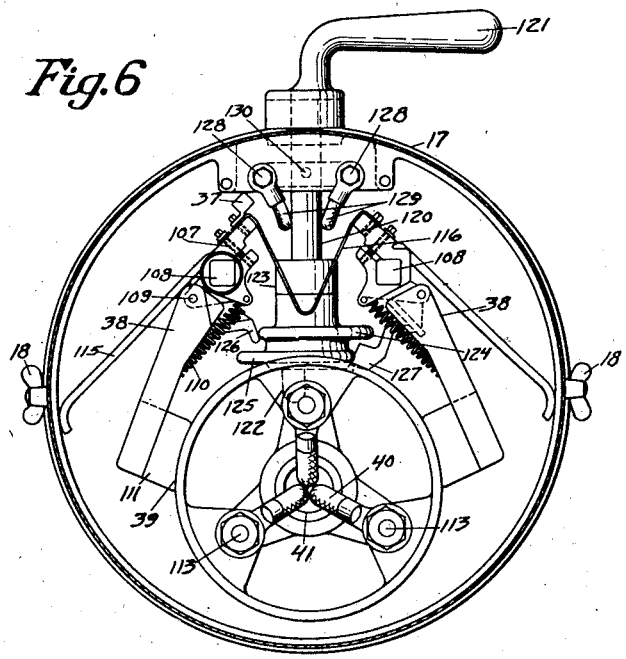
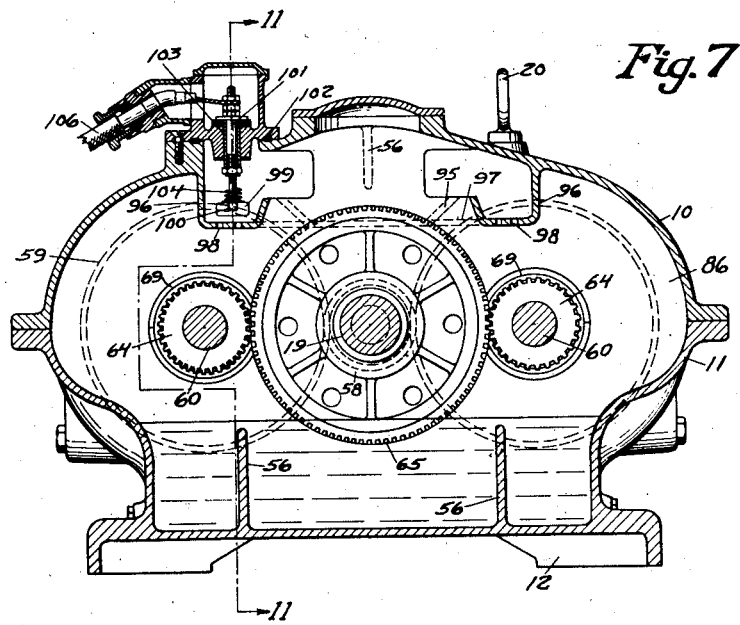

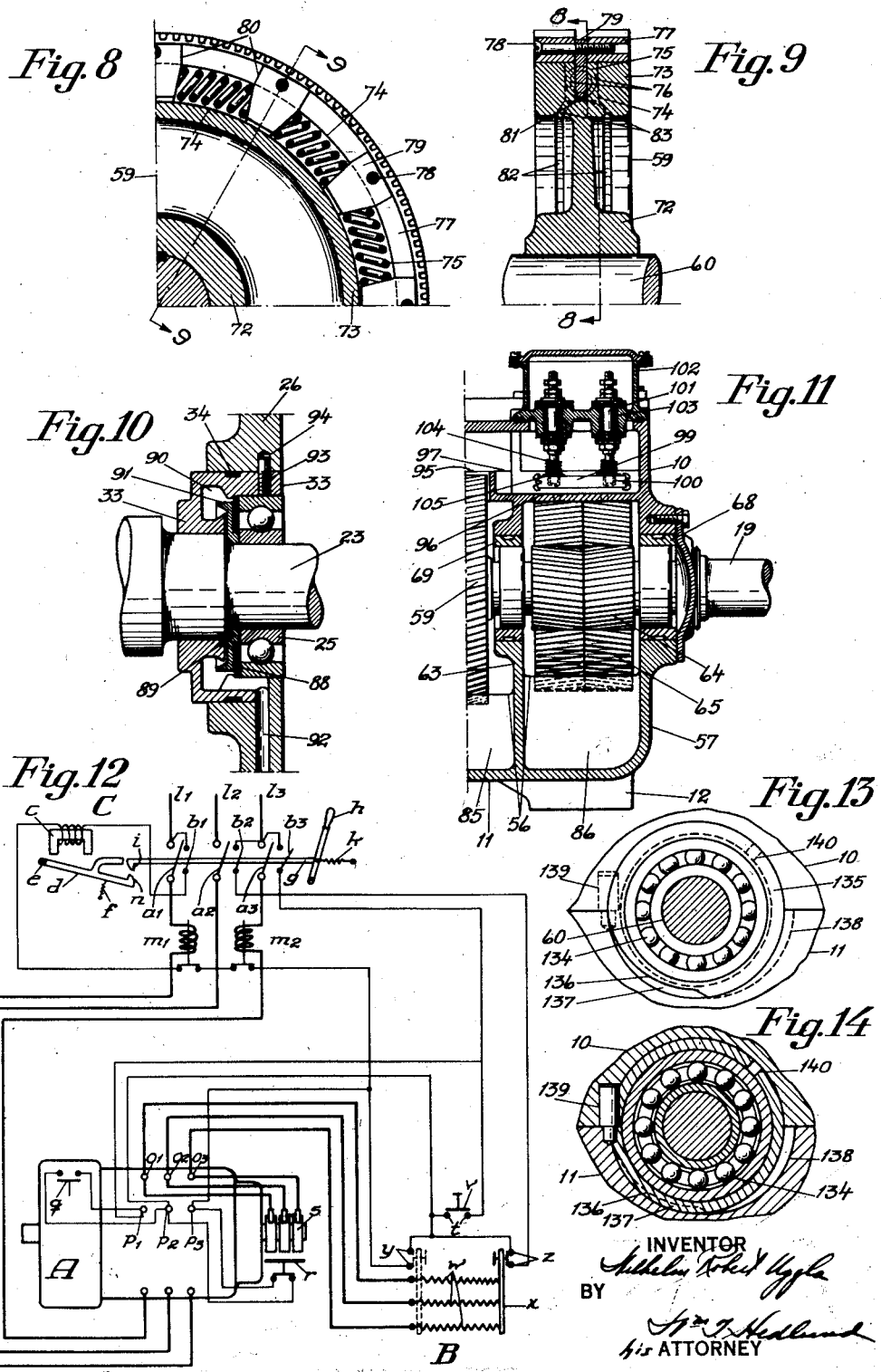

Patented June 13, 1933

1,913,523

UNITED STATES PATENT OFFICE

WILHELM ROBERT UGGLA, OF MORBY, SWEDEN, ASSIGNOR TO ALLMÄNNA SVENSKA ELEKTRISKA AKTIEBOLAGET, OF VASTERAS, SWEDEN, A CORPORATION OF SWEDEN

GEARED ELECTRIC MOTOR

Application filed April 16, 1930. Serial No. 444,703.

The type of geared electric motors previously known is built on the principle that a standard type electric motor is provided with a reduction gear fixed thereon, for instance by substituting a reduction gear device for one of the end shield bearing brackets of the motor.

In electric motors of the geared type the size of the reduction gear relatively to the motor size increases on increasing motor capacity. In smaller geared motors the dimensions of the reduction gear are small enough to permit the casing of the gear to be directly secured to the motor casing, for instance by bolts or the like, that is, the gear casing can be carried by the motor casing. In larger motors of this type, however, the reduction gear is too heavy to permit such overhanging. In such cases it has, therefore, been necessary to support the gear casing in a suitable manner, for instance by the provision of feet extending from said casing. This arrangement involves, however, several disadvantages. For instance, it is difficult to attain a correct alignment of said additional feet and the feet of the motor casing, there being required difficult adjustments in mounting the motor and the gear. Moreover, bending stresses are created even if the bed plate or foundation is carefully manufactured.

The main object of my present invention is to provide an improved geared electric motor in which the gear and the motor form one unit comprising a common casing containing the gear and motor, said casing preferably being divided horizontally.

Further objects of the invention will appear from the following description of a preferred embodiment thereof in a geared electric motor as shown in the accompanying drawings.

In the drawings:—

Fig. 6 is a section on an enlarged scale along the line 6—6 in Fig. 3 showing the collector-ring device of the electric part of the unit;

Fig. 7 is a section on the line 7—7 in Fig. 3 showing especially the gear part of the unit containing an oil relay;

Fig. 8 shows a section on the line 8—8 in Fig. 9 which in turn is a section on the line 9—9 in Fig. 8, both figures illustrating a yieldable gear wheel of the gear;

Fig. 10 is a horizontal section on an enlarged scale showing the oil packing device between the gear part and the electric part of the unit;

Fig. 11 is a horizontal section on an enlarged scale of a circuit-breaker with no-oil release on the line 11—11 in Fig. 7;

Fig. 12 is a wiring diagram of the electric connections of the unit; and

Figs. 13 and 14 show a modified embodiment of a detail of the gear part of the unit.

In the following the different parts of my improved geared electric motor unit will be described in detail.

I. GENERAL CONSTRUCTION

Figure 1:
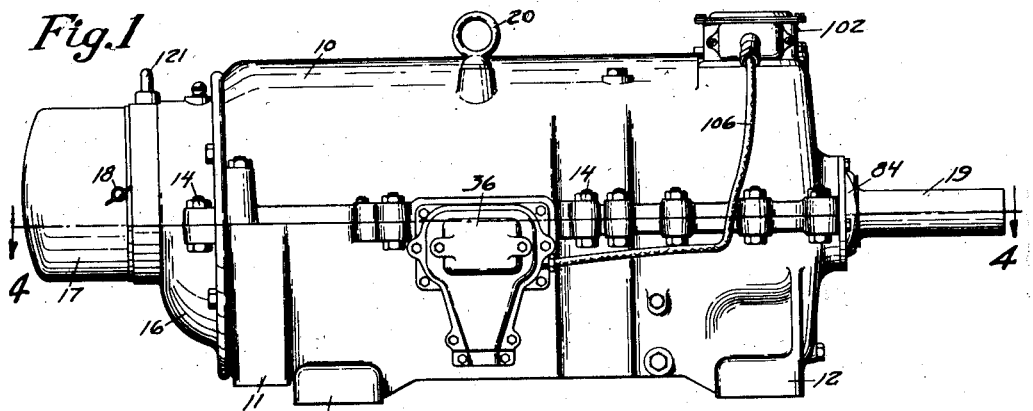
Fig. 1 is a side view of a geared electric motor unit.
Figure 2:
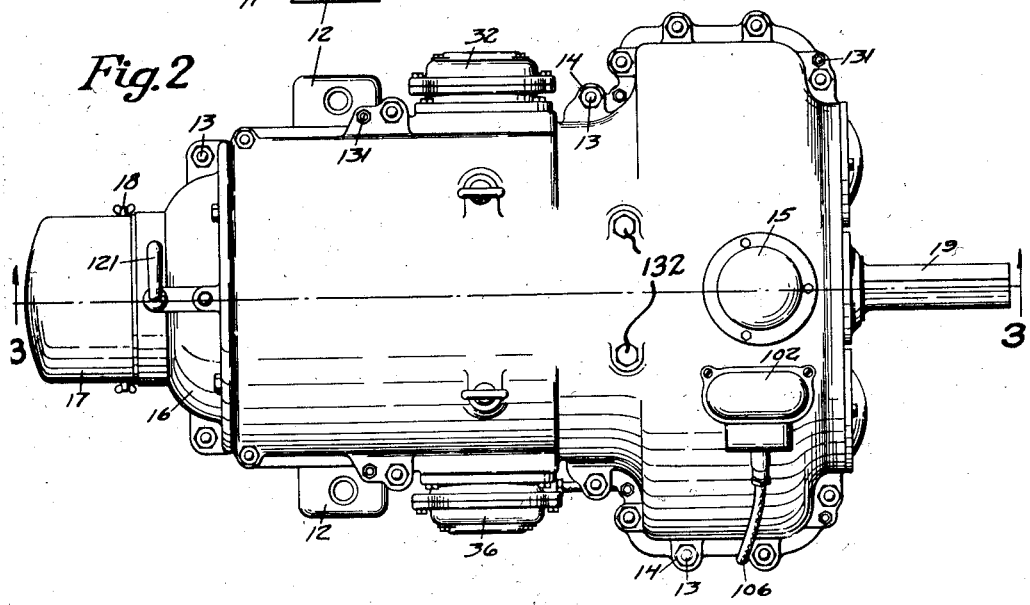
Fig. 2 is a top plan view.

With reference especially to Figs. 1 and 2 my improved geared electric motor unit comprises a casing or frame 10, 11 common to the whole unit, that is, to the electric part as well as to the gear part. The lower part 11 of the casing is provided with four strong feet 12, one at each corner of the bottom of the casing. This construction makes the unit totally enclosed and causes the driving moment of the gear part to pass practically directly towards the strong feet 12 which is of great importance with respect to a precise running of the unit. The casing or frame is divided longitudinally into two halves 10, 11 secured together in known manner as for instance by screw bolts 13 and nuts 14. It is evident that this division of the casing into a top part 10 and a bottom part 11 involves several advantages with regard to inspection and repair which is easily effected after the removal of the top part 10, and also with regard to the mounting and dismantling of the different parts of the unit as will be further described. Reference character 15 designates a cover for an inspection opening in the top part 10 of the casing covering the gear. A bearing shield 16 is secured to the one end of the casing in a suitable manner and is divided into two halves corresponding to the halves of the casing proper, said parts of the shield 16 being secured together by screw bolts 13 and nuts 14. In this bearing shield the driving shaft is journalled in a manner described in the following. A separate undivided cap 17 surrounds the collector-ring device of the electric part of the unit and is secured in a suitable manner to the bearing shield 16, as for instance by means of wing nuts 18. At the other end of the casing the driven shaft 19 extends through a bearing in a manner described in the following. At the top part of the casing two rings 20 or the like are provided for facilitating the transportation of the unit and the removal of the top half part of the casing. Further details shown in these figures will be more fully described in the following.

II. THE ELECTRIC PART

Figure 3:
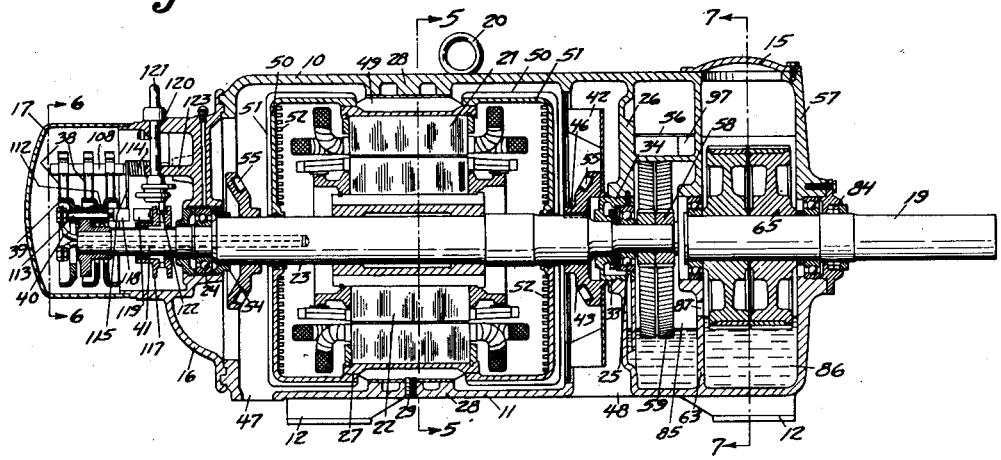
Fig. 3 is a cross-sectional view taken on the line 3—3 of Fig. 2.
Figure 4:
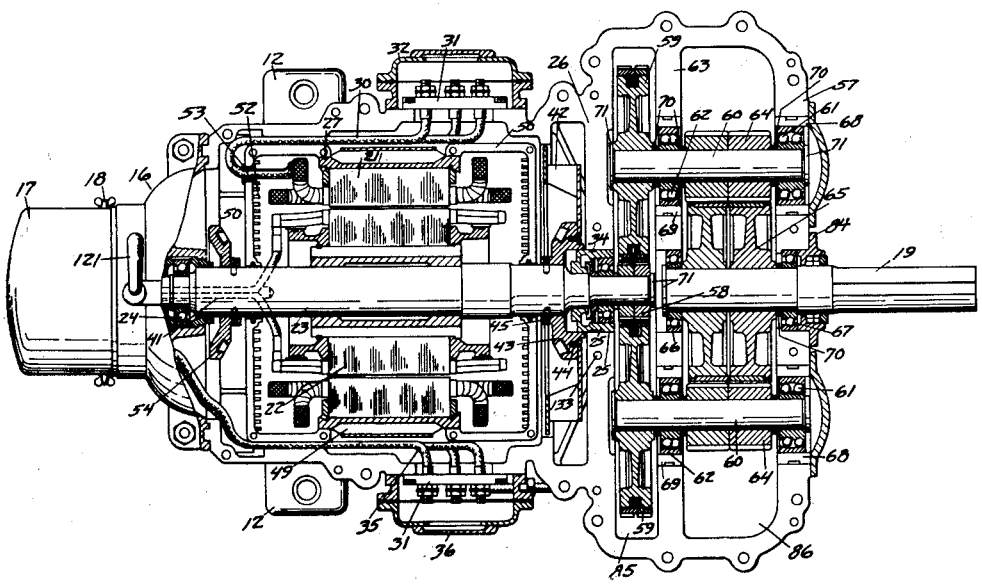
Fig. 4 is a cross-sectional view taken on the line 4—4 of Fig. 1.

The electric part of the unit is shown in section in Figs. 3 and 4. It comprises a stator 21 and a rotor 22, the latter fixed to the motor shaft 23 in any suitable manner. At one end (the left hand end in Figs. 3 and 4) the shaft 23 is journalled in a bearing, for instance a ball bearing 24 secured to the bearing shield 16. The shaft 23 extends from said bearing to the collector-ring device which, consequently, is associated with the overhung portion of the shaft. At the other end (the right-hand end in Figs. 3 and 4) the shaft 23 is journalled in a bearing, for instance a ball bearing 25, arranged in a transverse partition 26 dividing the common casing of the unit into two compartments, one of which houses the electric part and the other one the gear part of the unit.

(a). The stator

The stator plates and their windings are designated as a whole by reference character 21 and are arranged in a separate annular casing or cage 27 held in position by means of flanges 28 extending from the common casing and secured by a screw pin 29 (see Fig. 3). When mounting the stator, it is simply placed in the bottom half 11 of the casing so as to rest on the flanges 28 and it is then secured in position by the pin 29. Thus, the stator 21 is readily accessible for inspection and repair, it being only necessary to remove the top half of the casing whereupon the stator can be lifted out as a whole after the rotor has been taken out from the unit in a manner to be described in the following, or the stator and the rotor can be removed together. Hence, it is not necessary to displace the unit from its bed, which is very advantageous as such displacement usually is troublesome and, moreover requires detachment of the underground cables, and readjustment of the unit.

Electric current is supplied to the stator windings by means of cables 30 extending from a terminal plate 31 in the casing at one side thereof. This plate 31 may be covered by an ordinary protecting cover or a cable box 32 may be provided, the latter arrangement being shown in Fig. 4.

(b). The rotor

As above stated the electric rotor 22 is fixed on the shaft 23. At the outer surface of the bearing box 33 a groove 34 (see Fig. 10) is provided containing a wick soaked with soft soap serving as packing means against oil leakage axially and outwardly around the bearing box. However, this arrangement is only a precautionary measure, other means being provided to prevent leakage, as will be described in the following.

Electric current is supplied to the rotor by cables 35 extending from the cable box 36 (see also Fig. 1) to the collector-ring device through a bore in the bearing shield 16 arranged at the plane of division to terminals 37 of the brush holders 38 (see Fig. 6). From the collector-rings 39 cables 40 extend through a bore 41 in the shaft 23 (see especially Fig. 4) to the rotor windings 22.

(c). Cooling of the electric part

Figure 5:
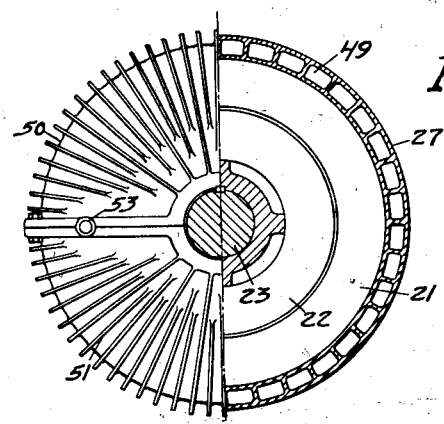
Fig. 5 illustrates in its left half an end view of the cover of the electric part of the unit and in its right half a section on the line 5—5 in Fig. 3.

The cooling of the electric part of the unit is effected by axial ventilation by a fan 42 (see Figs. 3 and 4) provided between the electric part and the gear part. The fan 42 is fixed on a hub 43 by screws 44, which hub 43 is secured to the shaft 23 by means of radially extending screws 45 and a key 46. Air is drawn in through an inlet opening 47 formed in the casing and exhausted through an outlet opening 48. As seen especially in the right half of Fig. 5 the annular casing 27 of the stator is provided with a plurality of cooling channels 49 extending axially of the casing and open at their both ends. These channels are traversed by the main part of the air (the whole quantity of cooling air except that passing through the rotor), thus effecting a good cooling action.

However, in some cases it may be of advantage to provide for an indirect cooling of the electric part, that is, to provide a cooling system in which the cooling air does not directly meet the windings of the electric part, this being of importance especially when the unit is erected in dusty localities. The embodiment shown in the drawings is provided with such a cooling system. As seen in Figs. 3 and 4 end covers 50 are provided at opposite sides of the annular stator cage 27, said end covers 50 and annular cage 27 entirely enclosing the electric part. These end covers 50 are divided into two halves corresponding to the two halves of the principal casing, said halves being secured together in known manner. At their outer surface the end covers 50 are provided with a plurality of radially extending cooling ribs or fins 51 (see the left half of Fig. 5) and at their inner surface with a plurality of projections or studs 52 (see Figs. 3 and 4) for the purpose of increasing the cooling surfaces. In this system of indirect cooling the air is drawn in through the inlet opening 47, sweeps past the left end cover 50 (Figs. 3 and 4), flows through the cooling channels 49 in the stator cage 27, sweeps past the right end cover 50 and exhausts through the outlet opening 48. The cables 30 pass through a bushing 53 at the plane of division of one end of the cover 50. In such cooling system the electric cables will be in the path of the whole quantity of air, and if the air is impure and injurious to the cables, the latter may be constructed in any suitable manner so as to resist the destructive action of the impure air.

For balancing purposes a hub 54 similar to the fan hub 43 is secured to the shaft 23 at the opposite side of the electric part symmetrically to its central vertical plane, said hubs 43 and 54 being provided with cavities 55 in which lead or the like may be placed so as to balance the rotor in a correct manner.

In prior constructions the gear part was unsuitaby heated by the electric part, the portion of the gear adjacent to the electric part growing considerably warmer than the opposite end of the gear. Of course, this difference in temperature between the ends of the gear is unsuitable for a proper tooth engagement as the gear will expand differently. In my geared electric motor unit this drawback is eliminated by the gear part being separated from the electric part by means of the partition 26 above referred to. I have found by this construction that the temperature of the gear is maintained uniform and at a temperature of only about 15° above the temperature of the surrounding air, this temperature corresponding approximately to the temperature of the air exhausted from the motor compartment.

III. THE GEAR PART

(a). General construction

As already stated, the casing of the gear part of my improved unit is made integral with that of the electric part. The part of the casing which houses the gear is stayed by a plurality of longitudinal flanges 56 (see Fig. 7) extending axially into partition 26 and between the end wall 57 of the casing.

The gear part of my unit is of the so-called double type, that is to say the motor shaft 23 and the driven shaft 19 are arranged co-axially in relation to each other, having two identical series of gear wheels arranged therebetween, one on each side of said shafts.

Secured at the end of the motor shaft 23 adjacent to the gear part is a pinion 58. In engagement with said pinion on each side thereof are two gear wheels 59, each secured to an intermediate shaft 60, said shafts being each journalled in two bearings, for instance ball bearings 61, 62, one 61 arranged in the end wall 57 of the casing and the other in a partition wall 63 arranged transversely of the toothed gearing casing. Secured to each of said intermediate shafts 60, intermediate to said bearings 61, 62, is a pinion 64, both said pinions engaging a common gear wheel 65 secured to the driven shaft 19. The shaft 19 is journalled in the same manner as the intermediate shafts 60, for instance by means of ball bearings 66, 67. The construction of the gear will especially be clear from Figs. 4 and 7.

All the pinions and gear wheels are of the double herring bone type, each consisting of two halves placed close to one another and having obliquely directed teeth.

The bearings 61 and 62 of the intermediate shafts 60 are mounted in bearing races 68 and 69, respectively. When dismantling the unit, it is impossible to lift the intermediate shafts 60 when the pinions 64 and the yieldable gear wheels 59 thereon are in engagement with the gear wheel 65 and the pinion 58 on the driven and the driving shaft, respectively. In order to disengage the gear wheels of the bearing, the bearing races 68 and 69 are first removed, a sufficient play then being had for displacing the intermediate shafts 60 laterally so as to bring the gear wheels out of engagement with each other.

In order to maintain the gear wheels and the shafts of the gear in their position and to prevent their axial displacement, rings 70 are provided between the bearings and the wheels and plates 71 are secured to the ends of the shafts by bolts, not shown.

In geared electric motors hitherto known the shaft of the slowest running gear wheel 65 has been journalled only at one end thereof, that is, the wheel is mounted on an overhanging portion of the shaft. In this construction the driven shaft could not be exactly guided, nor could unexpected loads, easily occurring on account of incorrect mounting, settlings in the adjacent bearings, etc., be taken up. In my improved unit these disadvantages are eliminated by the slowest running shaft 19 being journalled at both sides of the gear wheel 65, thus ensuring a more effective journalling of the shaft.

(b). *The yieldable gear wheels*

The gear wheels 59 in engagement with the driving pinion 58 are provided with yieldable tooth rims, as especially shown in Figs. 8 and 9. The hub of the gear wheel 59 has an inner part 72 by which the wheel is secured on the intermediate shaft 60 and an outer part 73, the latter being provided with recesses 74 in which spiral springs 75 are located. Offsets 76 between two adjacent recesses form abutments against which the springs 75 bear. By providing the springs in the recesses, they may be given a certain initial tension. Arranged peripherally on the outer part 73 of the hub is a toothed rim 77 divided into two halves connected by screws 78, said screws also securing plates 79 located in guiding grooves 80 between the two halves of the rim 77 and extending into grooves 81 between the offsets 76 and thus forming abutments for the springs 75. The two halves of the rim are each provided with teeth of r shape so as to form together a V-shaped tooth-profile. It is evident that in operation of the gear the power is transmitted from the driving pinion 58 to the yieldable toothed rims 77 and therefrom through the plates 79, the helical springs 75 and the offsets 76 to the hub 73, 72 and the intermediate shafts 60.

In order to effect lubrication of the helical springs 75 in the yieldable gear wheels 59, annular grooves 82 are provided in the hub of the wheel from which channels 83 lead to the central recesses 74 in the hub.

In prior constructions the slowest running gear wheel 65 was, as stated above, secured in overhung arrangement on the driven shaft 19, whereas the yieldable gear wheels 59 were journalled in bearings on both sides. In the construction shown the arrangement is the contrary, the driven gear wheel 65 being, as already stated, journalled at both sides, with the advantages mentioned above, whereas the yieldable gear wheels 59 are secured in overhung arrangement on the intermediate shafts 60. However, this manner of journalling the intermediate shafts 60 does not involve any disadvantage, as the yieldable gear wheels 59 are not subjected to any unexpected or uncontrollable forces. Further, it has proved that by journalling the different shafts in the manner described and shown the additional advantage is gained that the yielding of the intermediate shafts will be smaller than would be the case if said shafts were journalled in the old manner.

(c). *Oil packing means*

In a gear it is generally difficult to prevent oil leakage around the driving and driven shafts. It has not proved suitable to apply the oil splashing principle to the driven shaft, as this shaft runs too slowly to obtain an effective lubrication. For this reason I simply use a packing box 84 for said shaft, said box being preferably so arranged as to permit re-packing without dismantling the unit. On the rapidly running shaft, however, it is not suitable to use a packing box, and this is also unnecessary as an effective splashing action can be obtained on account of the high velocity of rotation of said shaft.

As already stated, the partition wall 63 divides the gear casing into two compartments, one (85) containing the rapidly running yieldable gear wheels and another (86) containing the slower running gear wheels. Oil supplied to the last-mentioned compartment 86 passes an over-flow 87 (see Fig. 3) in the partition wall 63 into the first compartment 85. The filling of the outer compartment 86 is so adapted as to attain a certain oil level in the latter compartment 85 which may be controlled by means of an oil stand pipe or the like (not shown). In such manner two different oil levels are obtained which may be adjusted in the best possible manner. As will be described in the following when dealing with the lubrication of the gear, oil is splashed up by the yieldable gear wheels 59 into sumps arranged above the secondary pinions 64 and provided with holes at their bottom, the oil thence flowing down into the compartment 86 for the slowest running wheels, whilst lubricating said wheels. It has shown in practice that the difference in level between the two compartments is not equalized during operation.

The oil packing means between the gear part and the electric part of my unit is especially clear from Fig. 10 and Fig 4. Arranged behind the ball bearing 25 of the driving shaft 23 is a stationary plate 88 preventing the greater part of the oil from passing through the bearing. The plate is provided with an annular opening adjacent an oil ejector 89. The oil passing through the bearing is forced by the oil ejector 89 into an annular space 90 in the bearing box 33, said oil ejector being provided with a lip 91 so as to cause oil having entered said space to run down into the lower part of the bearing box. At this place holes and channels 92 are provided so as to cause the oil to be drained back to the gear (see Fig. 3). It is of importance that the return hole or channel opens below the normal oil level in the gear casing, as otherwise, if the return hole is arranged above said level, the rapidly rotating yieldable gear wheels 59 may force the oil upwardly into said hole and up to the oil packing means, thus obtaining a result contrary to that desired.

Between the lip 91 in the bearing box 33 and the oil ejector 89 there is a little play which must be very small as otherwise the oil will creep along the stationary bearing box, thus causing leakage. If on the contrary said play is small this oil stream will be caught by the oil ejector and returned into the bearing box. As it is difficult to keep all axial measures with sufficiently small tolerance a readjustment in mounting will be necessary. On mounting, the bearing box 33 is adjusted into its correct position and then the distance between the guiding pin 93 screwed into the box 33 and the end wall 57 of the casing is carefully ascertained. Thereafter the same distance is measured on the top half 10 of the casing and a hole 94 is bored into the partition wall 26 of said half at said distance from the end wall, so that, when the top half is laid down on the bottom half 11, the guiding pin 93 engages said hole 94, thus fixing the bearing box in all directions.

(d). The oil relay

The unit is protected against dangerous overload currents by fuses or automatic controlling-means and, consequently, the gear part of the unit cannot be subjected to any continuous overload resulting in injury of the teeth. However, the gear will be ruined rapidly, if sufficient oil is not at hand for lubrication. An oil controlling device for the gear must operate very quickly, that is before any undue wear has occurred. For this purpose, my improved unit is provided with an oil relay preventing any damage of the gear. The relay is especially shown in Figs. 7 and 11.

Formed on the top half 10 in the compartment 85 in which the yieldable gear wheels 59 run and above the driving pinion 58 is an oil cup 95 into which oil is splashed up by one of the rapidly rotating yieldable gear wheels 59. Formed on the top half above each of the pinions 64 of the intermediate shaft 60 is an oil sump 96 or the like communicating with the oil cup 95 by means of a groove 97 formed in the partition wall 63. The cup 95 as well as the sump 96 facilitate the reinforcing of the gear part of the casing. At the bottom of the sumps 96 are holes 98, the total area of which is so adapted as to cause oil to collect in the sumps to a certain level. Any superfluous oil may run off over the edges of the sumps. Arranged in one of the sumps is a float 99 of electrically conducting material, for instance brass, provided with two recesses 100 and extending into each of said recesses is a pin 101 fixed to a connection box 102 and insulated as at 103 from same, said box being fixed to the casing 10. A spring 104 coiled around each of the pins 101 is at its upper end secured to the pin and bears at its lower end against metal contacts 105 fixed to the float 99, silver being preferably used as material for said contacts. A double cable 106 extends from the top end of the pins 101 to the terminal plate 31 of the rotor from where the one conductor of the cable 106 extends to one of the two control contacts in the collector-ring device, whereas the other conductor extends to the motor switch box, this arrangement being more fully described in the following.

As long as the compartment 85 of the casing in which the yieldable gear wheels rotate contains oil sufficient to fill the cup 95 by splashing action the sump 96 in which the float 99 is arranged will contain such a quantity of oil flowing in through groove 97 that the float 99 ascends to such a level as to ensure electric contact between the pins 101 by means of the contacts 105 of the float, the float itself and the springs 104. If on the other hand the oil in said compartment has sunk to such a level that the yieldable gear wheels 59 cannot deliver a sufficient quantity of oil or any quantity at all into the oil cup 95, then the sump 96 is emptied causing the float 99 to descend so that the contact is broken.

(e). The collector-ring device

As stated above, the cables 30 and 35 for the stator and rotor windings, respectively, are conducted to the electric part of the motor from terminal plates 31 and cable boxes 32 and 36, the three cables 30 for the stator windings being directly connected with same, whereas the three cables 35 for the rotor windings are led to the collector-ring device shown especially in Figs. 3 and 6. The three rotor cables are in known manner each led to a terminal 37 (one being shown in Fig. 6) fixed to a supporting member 107 secured to a square shaft 108, two such shafts being provided each carrying three brush holders 38 of the three pairs of such holders. The brush holders 38 are each pivotally mounted on the respective supporting member 107 as at 109, said member being connected with the holder 38 by means of a spring 110 tending to maintain the brush 111 of the holder in contact with the corresponding collector-ring 39. These collector-rings 39 are insulated from each other as at 112 and are each electrically connected with a screw terminal 113. A cable 40 leads from each of said screws 113 through the bore 41 in the driving shaft 23 to the rotor windings 22, as stated above.

The shafts 108 are each journalled at one end in the bearing shield 16 and fixed to each of the shafts 108 is the one end of a helical spring 114 coiled around the shaft 108 and terminating at its other end in an arm 115 resting against the bearing shield 16. The brush holders 38 are electrically connected in pairs by means of a V-shaped spring 116.

The short-circuit means of the collector-ring device comprises a short-circuit ring 117 slidingly mounted on the driving shaft 23 and short-circuit contacts 118 and 119, two for each pairs of brushes. These contacts are placed axially and the one 118 is formed as a stirrup, whereas the other contact 119 has the form of a knife permitting good resiliency in the contact. The short-circuit ring 117 is operated by a manœuvring shaft 120 provided with a handle 121 and engaging by a stud 122 a groove in said ring with a certain play. The manœuvring shaft 120 is journalled in the upper wall of the shield 16 and in a projection 123 on said shield. Fixed on said shaft 120 are two cam disks 124 and 125 arranged eccentrically on the shaft. Abutting against said disks are arms 126 and 127 secured to the shafts 108. On account of the action of the helical springs 114 said arms 126 and 127 will rest with a certain pressure against the cam disks 124 and 125, thus preventing the manœuvring shaft 120 from unintentional rotation during running with following friction against the groove in the short circuit-ring 117 and corresponding wear.

When operated the manœuvring shaft 120 is turned through somewhat more than 180° so that the contact between the stud 122 and the groove in the ring 117 necessary for the displacement of the latter ceases, thus preventing wear of these parts.

The collector-ring device is provided with means for preventing the rotor from being short-circuited, before the motor-starter is short-circuited. This means comprises two contacts 128 connected by cables 129 in series with an undervoltage release in the motor switch box. A pin 130 on the manœuvring shaft 120 short-circuits said contacts 128 when said shaft is in starting position. Consequently, the motor switch box can only be operated when this circuit is closed. When the collector-ring device is short-circuited this circuit will, of course, be broken, but at said moment the whole contact device is shunted at the motor-starter.

VI. THE ELECTRIC CONNECTIONS

The electric connections of the unit are shown diagrammatically in Fig. 12, the motor shown being of the three-phase type. In this figure reference character A designates the motor, B the starter and C the switch box controlling device. Electric current is supplied through the three conduits $l_1$, $l_2$, $l_3$ over contacts in the motor controlling device comprising three main contacts $a_1$, $a_2$, $a_3$ and three auxiliary contacts $b_1$, $b_2$, $b_3$ and over two overload relays $m_1$, $m_2$ arranged in two of the conduits $l_1$, $l_2$, $l_3$ leading to the stator terminal box. In operation the contacts $b_1$, $b_2$ are closed a little earlier than the other contacts in the switch box for the purpose to be described in the following. The motor controller C comprises an undervoltage release consisting of an electro-magnet $c$ with an armature $d$ pivotally mounted as at $e$ and actuated by a spring $f$ tending to keep the armature in unattracted position. The armature $d$ is fork-shaped and co-operates with a rod $g$ on which all the knives of the contacts $a_1$, $a_2$, $a_3$ and $b_1$, $b_2$, $b_3$ are secured. At its end the rod $g$ is provided with a hook $i$ co-operating with a hook $n$ at the end or one of the fork shanks. The rod $g$ is provided with an operating handle $h$. A spring $k$ keeps the rod $g$ in position out of engagement with the fork-shaped armature $d$.

The rotor cable box has six terminals, three main contacts $o_1$, $o_2$, $o_3$ and three contacts $p_1$, $p_2$, $p_3$ for auxiliary conduits. $q$ designates the oil relay, $r$ the control contacts designated in Fig. 6 by 128, $s$ the collector-ring device and $t$ a contact operated by, for instance, a press-button $v$.

The motor-starter B consists in known manner of rheostats $w$ co-operating with a movable control arm $x$ which can be moved along the rheostats in order to vary the resistance. This arm co-operates with two contacts $y$ and $z$.

When the motor is to be started the control contacts $r$ (128) are first closed by rotating the manœuvring handle 121 (see Fig. 6) resulting in the brushes 111 of the collector-ring device being brought in contact with the collector-rings 39. Then the operating handle $h$ is turned in counter-clockwise direction as shown in Fig. 12 resulting in the contacts $b_1$ and $b_2$ being first closed so that an electric circuit is established from conduit $l_1$, through the electro-magnet $c$ of the undervoltage relay, overload relays $m_1$, $m_2$, contact $p_3$ on the rotor cable box, control contact $r$, contact $p_2$ on the rotor cable box, contact $z$ of the motor-starter, contact $b_2$ in the motor controlling device and conduit $l_3$. Thereby the electromagnet $c$ is excited attracting its armature $d$ against the action of the spring $f$, whereby the operating handle $h$ can be turned further, until all contacts in the motor controlling device are closed. Should the control contact $r$ not be closed before actuating the motor controlling device, the rod can be displaced only through such a distance that contacts $b_1$ and $b_2$ are closed, this on account of the rod abutting against the fork shank. In such case the circuit above referred to is broken at the control contact $r$ so that the armature $d$ is not attracted. Then the stator gets current and the motor-starter B is actuated putting the resistances $w$ gradually out of circuit. As soon as the motor-starter is actuated, the electric circuit above referred to would be broken at contact $z$ resulting in the armature $d$ falling down and breaking the circuit of the stator, if no means were provided for preventing this result. Such means consists in the press-button $v$ by which the contact $t$ is closed, before the motor-starter is actuated. The circuit through the undervoltage relay is by this means maintained over said contact $t$, contact $b_3$ in the motor controlling device and conduit $l_3$. The contact $t$ is kept closed, until the motor-starter B is entirely short-circuited. Then the press-button $v$ can be released, as now the contact in the oil relay $q$ is closed on account of oil being splashed up in the oil trough 96 (see Fig. 7) in a sufficient quantity to close said contact. Then the circuit for the undervoltage relay passes from conduit $l_1$, through contact $b_1$, undervoltage relay coil, overload relays $m_1$, $m_2$, contact $y$ of the motor-starter B, contacts $p_2$ of the rotor cable box, oil relay $q$, contact $p_1$ of the rotor cable box, contact $b_3$ of the motor controlling device and conduit $l_3$. When the motor-starter has been short-circuited, the rotor is short-circuited over the motor-starter. By returning the manoeuvring handle 121 into its original position, the brushes 111 are lifted from the collector-rings 39 and the control contact $r$ is broken, thus short-circuiting the rotor within the motor, this latter operation being not inevitably necessary, as the control contact $r$ does not establish any electric circuit at this stage. By lifting the brushes from contact with the collector-rings in this manner, the brushes are protected against wear.

When the contact of the oil relay is broken in the manner above described the circuit of the undervoltage relay is broken, resulting in all contacts of the motor controlling device being broken and the motor stopped.

VII. OTHER CHARACTERISTICS OF MY IMPROVED UNIT

As stated above the stator and the rotor can be removed from the casing without it being necessary to remove the casing from its bed or foundation. For this purpose the top half 10 of the casing together with the upper part of the bearing shield 16 are unscrewed and removed, after the casing 17 of the collector-ring device having been loosened and removed. Then the bearing races 68 and 69 of the intermediate shafts 60 are removed whereupon said shafts are displaced laterally so as to bring their toothed wheels 59 out of engagement with the driving pinion 58. Now the stator 21 with its cage 27 and end covers 50, the rotor 22, the driving shaft 23, the bearing box 25 and the driving pinion 58 as well as the collector-ring device can be lifted out from the bottom casing half 11. If the end covers 50 and the bottom part of the end shield 16 are removed and also the fan 42 is unscrewed from its hub 43 by loosening the screws 44 the rotor together with the parts connected therewith may be drawn out axially of the casing and then the stator with its cage 27 may be lifted out.

In order to facilitate the mounting of the top casing 10 onto the bottom casing 11 the former is provided with a plurality of guiding pins 131 to be brought into engagement with corresponding holes in the bottom casing 11.

In addition to the screw bolts 13 and nuts 14 connecting the two halves together head screws 132 may be provided to be screwed through holes in the top casing 10 into corresponding threaded holes 133 in the bottom casing 11.

It is evident that by adapting the diameters of the gear wheels of the gear any desired transmission ratio may be obtained between the driving and the driven shaft and that it is also possible to use more than one intermediate shaft at each side of said shafts in order to further decrease said ratio.

Figs. 13 and 14 show an embodiment of the arrangement for bringing the gear wheels of the intermediate shafts out of engagement with the gear wheels of the driving and driven shafts if the bearings journalling the intermediate shafts are mounted in undivided races. Fig. 13 shows a side view of one of the bearings of the intermediate shafts and Fig. 14 a central section therethrough. Reference character 60 designates the intermediate shaft, 134 the bearing and 135 the undivided race. With 10 is designated the top part and with 11 the bottom part of the gear casing. The race 135 is provided with recesses 136 extending peripherally over a part of the race and formed with a central projection 137. In the bottom part 11 of the gear casing there is a peripheral groove 138 corresponding to the projection 137 and located on the opposite side of the driven and driving shafts. A pin 139 engages the race and the parts 10 and 11 of the casing for preventing rotation of the race.

When dismantling the gear the upper part 10 of the casing is removed. After the pin 139 has been removed the race 135 is turned until the projection 137 faces the groove 138. Then it is possible to displace the shaft laterally in that the projection 137 enters into the groove 138 and the gear wheels (59, 58 and 64, 65, see Fig. 4) are brought out of engagement with each other so that the shaft 60 can be lifted. By inserting a rod or the like in a hole 140 of the race 135 the turning of same is facilitated. The race is supported around its whole periphery when mounted in the casing as shown in the figures by the projection bearing against the casing. When under load thus no deflection of the race can occur.

The invention is not limited to the embodiments shown but may be varied in several respects without departing from its scope.

I claim:

1. A geared electric motor unit comprising an electric motor, a gear, a casing common to said electric motor and said gear and divided longitudinally into two halves detachably connected with each other, a transverse partition in said casing dividing same into two compartments, one for the electric motor and one for the gear, a driving shaft for the electric motor, a bearing for said shaft arranged in said partition, a box for said bearing having an annular space and means to return oil leaking through said bearing into said annular space from said space back into the gear compartment.

2. A geared electric motor unit comprising an electric motor, a gear, a casing common to said electric motor and said gear and divided longitudinally into two halves detachably connected with each other, a transverse partition in said casing dividing same into two compartments, one for the electric motor and the other for the gear, a transverse wall in said gear compartment dividing same into two chambers, and means to circulate oil from the lower portion of the inner chamber to the upper portion of the outer chamber.

3. A geared electric motor unit comprising an electric motor, a gear, a casing common to said electric motor and said gear and divided longitudinally into two halves detachably connected with each other, a transverse partition in said casing dividing same into two compartments, one for the electric motor and the other for the gear, a transverse wall in said gear compartment dividing same into two chambers, the lower parts of said chambers being formed as oil reservoirs, an oil cup in the upper part of the inner chamber, an oil sump in the upper part of the outer chamber communicating with said oil cup and provided with bottom holes and an over-flow in said wall.

4. A geared electric motor unit comprising an electric motor, a gear, a casing surrounding said electric motor and said gear and divided longitudinally into two halves detachably connected with each other, a transverse partition in said casing separating the electric motor and the gear, a transverse wall in the gear compartment dividing same into two chambers, the lower parts of said chambers being formed as oil reservoirs, means to circulate oil from the one chamber to the other and an electric circuit including a float and an electric part and adapted to be broken by said float upon an insufficient quantity of lubricant being circulated.

5. In a device of the character described, a casing longitudinally divided into an upper and a lower part, a transverse partition in each of said parts dividing said casing into a motor chamber and a gear chamber, an electric motor in said motor chamber, a shaft for said motor journalled in said partition and extending into said gear chamber, an intermediate transverse wall in said gear chamber, a driven shaft and a plurality of intermediate shafts journalled in an outside wall of said casing and in said intermediate wall, and intermeshing gears mounted on said motor shaft and said intermediate shafts and on said intermediate shafts and said driven shafts.

6. In a device of the character described, a casing longitudinally divided into an upper and a lower part, a transverse partition in each of said parts dividing said casing into a motor chamber and a gear chamber, an electric motor in said motor chamber, a shaft for said motor journalled in said partition and extending into said gear chamber, an intermediate transverse wall in said gear chamber, a driven shaft and a plurality of intermediate shafts journalled in an outside wall of said casing and in said intermediate wall, a gear mounted on each of said intermediate shafts between said partition and said intermediate wall, a pinion on said motor shaft meshing with said gears, and intermeshing gears mounted on said intermediate shafts and said driven shaft.

7. In a device of the character described, a casing longitudinally divided into an upper and a lower part, a transverse partition in each of said parts dividing said casing into a motor chamber and a gear chamber, an electric motor in said motor chamber, a shaft for said motor journalled in said partition and extending into said gear chamber, an intermediate transverse wall in said gear chamber, a driven shaft and a plurality of intermediate shafts journalled in an outside wall of said casing and in said intermediate wall, a yieldable gear mounted on each of said intermediate shafts between said partition and said intermediate wall, a pinion on said motor shaft meshing with said yieldable gears, and intermeshing gears mounted on said intermediate shafts and said driven shaft.

8. In a device of the character described, a casing longitudinally divided into an upper and a lower part, a transverse partition in each of said parts dividing said casing into a motor chamber and a gear chamber, an electric motor in said motor chamber, a shaft for said motor journalled in said partition and extending into said gear chamber, an intermediate transverse wall in said gear chamber, a driven shaft and a plurality of intermediate shafts journalled in an outside wall of said casing and in said intermediate wall, a gear mounted on said driven shaft between said outside wall and said intermediate wall, gears on said intermediate shafts meshing with said gear and intermeshing gears mounted on said intermediate shafts and said motor shaft.

9. In a device of the character described, a casing longitudinally divided into an upper and a lower part, a transverse partition in each of said parts dividing said casing into a motor chamber and a gear chamber, an electric motor in said motor chamber, a shaft for said motor journalled in said partition and extending into said gear chamber, an intermediate transverse wall in said gear chamber, a driven shaft and a plurality of intermediate shafts journalled in an outside wall of said casing and in said intermediate wall, a gear mounted on each of said intermediate shafts between said outside wall and said intermediate wall, a gear on said driven shaft meshing with said gears, and intermeshing gears mounted on said intermediate shafts and said motor shaft.

10. In a device of the character described, a casing longitudinally divided into an upper and a lower part, a transverse partition in each of said parts dividing said casing into a motor chamber and a gear chamber, an electric motor in said motor chamber, a shaft for said motor journalled in said partition and extending into said gear chamber, an intermediate transverse wall in said gear chamber, a driven shaft and a plurality of intermediate shafts each journalled in an outside wall of said casing and in said intermediate wall, said intermediate shafts projecting through said intermediate wall and said driven shaft being in axial alignment with the motor shaft, a pinion mounted in overhung relation on the end of the motor shaft, a gear mounted in overhung relation on each of said intermediate shafts between said partition and said intermediate wall, said gears meshing with said pinion, a driven gear mounted on the driven shaft between the outside wall of the casing in which the shaft is journalled and said intermediate wall and gears meshing with said driven gear and mounted on said intermediate shafts between the outside wall of the casing in which said shafts are journalled and said intermediate wall.

In testimony whereof I affix my signature.

WILHELM ROBERT UGGLA.